Dec. 15, 1931. J. E. BAINES ET AL 1,837,095
CHUCK
Filed Sept. 29, 1930 3 Sheets-Sheet 1
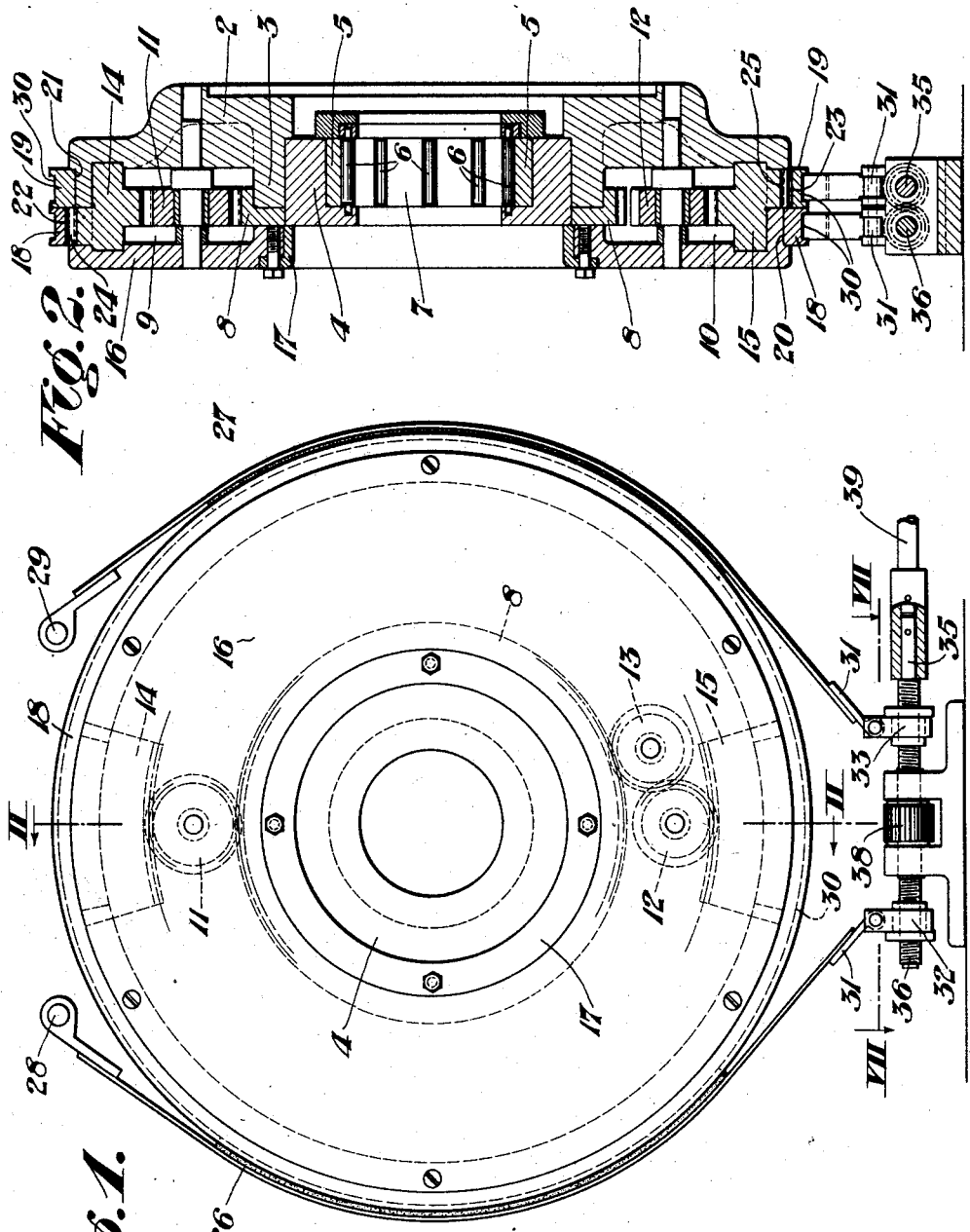
Inventors:
Joseph E. Baines and
Jacob P. Bosle.
by: *Usina & Rauber*
their Attorneys.

Dec. 15, 1931.  J. E. BAINES ET AL  1,837,095
CHUCK
Filed Sept. 29, 1930    3 Sheets-Sheet 2

Inventors:
JOSEPH E. BAINES and
JACOB P. BOSLE.
by:
their Attorneys.

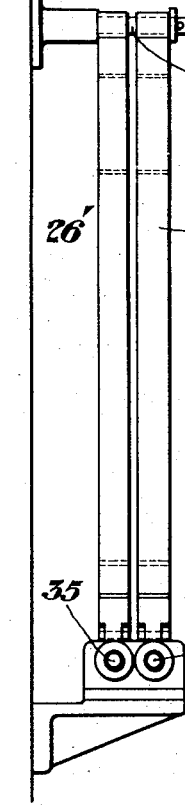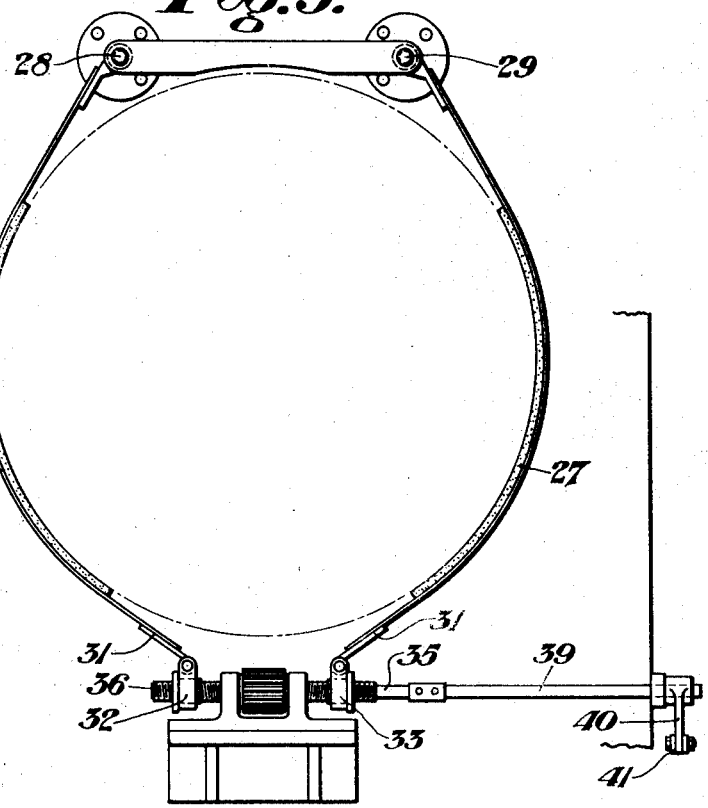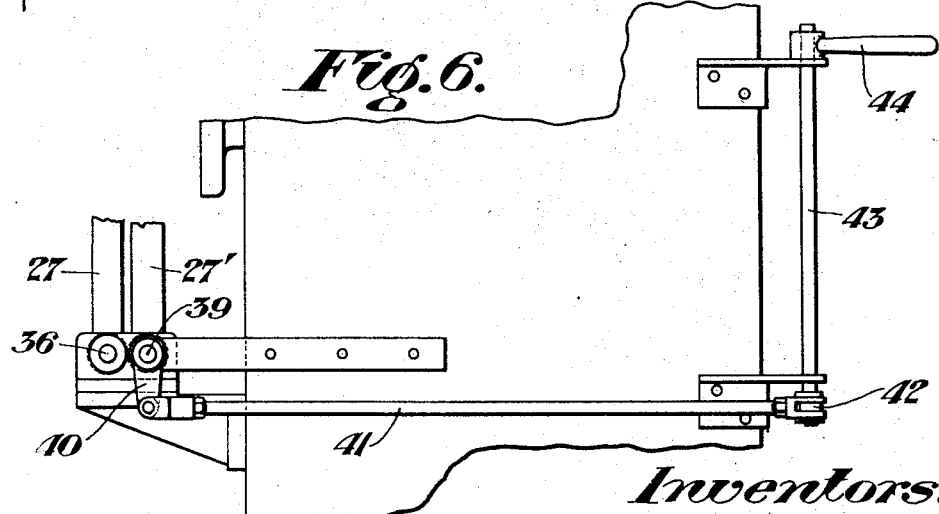

Patented Dec. 15, 1931

1,837,095

UNITED STATES PATENT OFFICE

JOSEPH E. BAINES AND JACOB P. BOSLE, OF PITTSBURGH, PENNSYLVANIA, ASSIGNORS TO NATIONAL TUBE COMPANY, A CORPORATION OF NEW JERSEY

CHUCK

Application filed September 29, 1930. Serial No. 485,286.

This invention relates to chuck operating mechanism used on pipe threading machines and the like and the present invention is an improvement on the chuck operating mechanism disclosed in Patent No. 1,676,814, granted to Joseph E. Baines et al. on July 10, 1928.

In the threading of pipe or other cylindrical bodies, it is desirable to maintain the work in the gripping device and to remove the same therefrom without interrupting the operation of the machine, or even though it is necessary or desirable to stop the machine for loading and unloading the work therefrom, it is advantageous to provide means for gripping the work in a simple and expedient manner.

The present invention is an improvement on the chuck operating mechanism disclosed in the aforementioned Letters Patent in that it provides for instantaneous gripping or releasing of pipe at the will of the operator by a mechanism which is adapted to come into action gradually and without jar or loss of time.

The object and nature of the present invention will become more apparent from a consideration of the accompanying drawings in which like reference characters designate like parts and in which—

Figure 1 is an end elevational view of a chuck and chuck operating mechanism embodying the principles of this invention.

Figure 2 is a cross-sectional view thereof taken on the line II—II of Figure 1.

Figures 4, 5 and 6 are views diagrammatically illustrating the chuck operating mechanism and its connected linkage.

Figure 3:
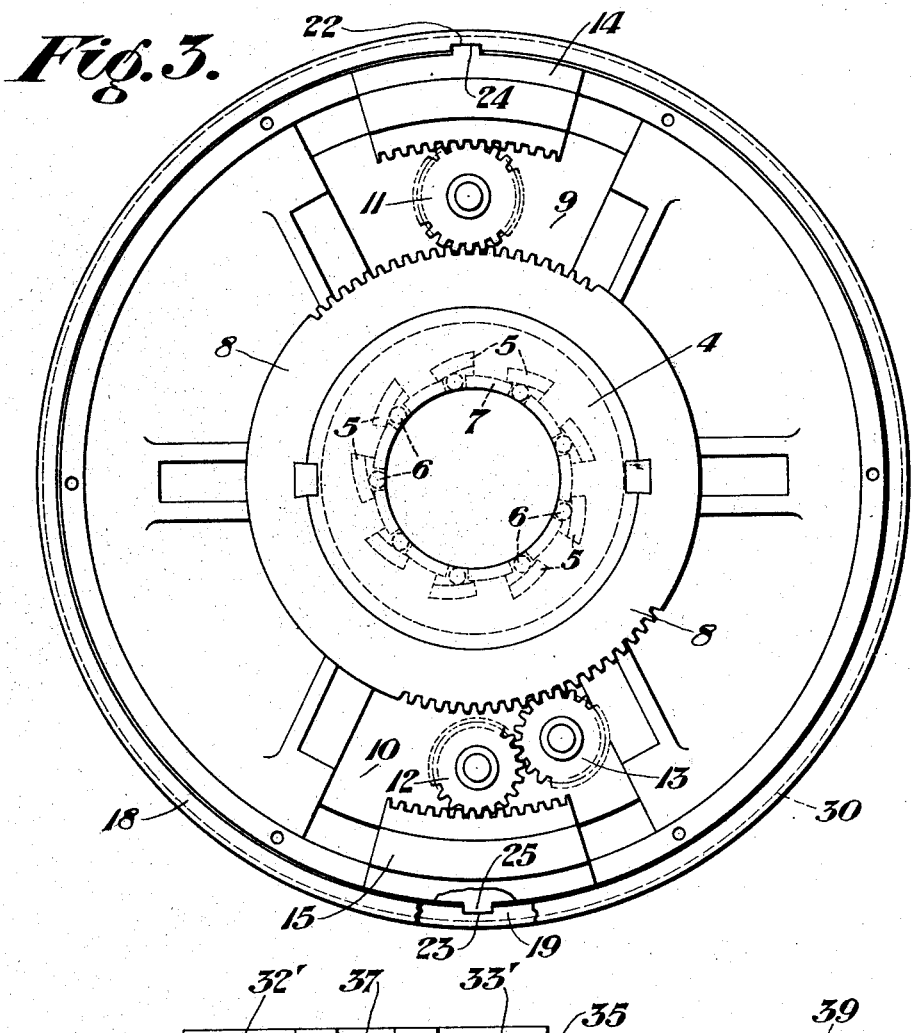
Figure 3 is a plan view of the chuck with the cap and keeper ring removed.
Figure 7:
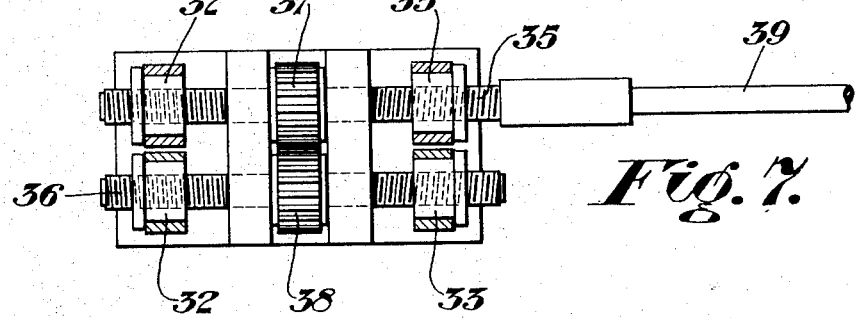
Figure 7 is a sectional plan taken on the line VII—VII of Figure 1.

With reference to Figures 1 to 3, inclusive, of the drawings, the chuck therein illustrated is generally of the construction shown and described in the aforementioned patent and comprises a chuck housing 2 having a projecting flange 3 within which is disposed a cam ring 4 provided with cam plates 5 which are adapted to engage rollers 6 mounted in a retaining ring 7. The rollers 6 are loosely mounted in slots of the ring 7 and are adapted to be engaged by the inclined faces of the cam plates to alter their radial position with respect to the axis of the chuck.

A ring gear 8 is concentrically mounted with the cam ring 4 and is adapted to actuate the rollers through the ring 7 to which it is secured. The chuck housing 2 is recessed at 9 and 10 for receiving gear wheels 11, 12 and 13 of which the wheels 11 and 13 are in constant engagement with the ring gear 8 and the gear wheels 11 and 12 in constant engagement with a pair of rack blocks 14 and 15.

A keeper ring 16 and cap ring 17 are secured to the chuck housing 2 to retain the elements hereinbefore described in their proper positions in the chuck housing.

The hereinbefore described mechanism is the same as that disclosed in the aforementioned Letters Patent and the novelty of the present invention resides in the manner of actuating the rack blocks 14 and 15 to operate the gripping mechanism of the chuck while the latter is in motion.

The operating mechanism for actuating the grippers consists of a pair of drums 18 and 19 which are disposed in peripheral grooves 20 and 21 provided in the chuck housing, the drum 18 being slotted at 22 and the drum 19 at 23 for engagement wth lugs 24 and 25 of the rack blocks 14 and 15 respectively. A plurality of brake bands 26—26' and 27—27' are suspended from fixed pins 28 and 29 and are disposed in grooves 30 of the drums 18 and 19. The lower ends of the brake bands are provided with eyes 31 which engage screw nuts 32, the bands 26—26' engaging screw nuts 32 and 32' and the bands 27—27' engaging screw nuts 33—33', the nuts 32'—33' being engaged with a left and right hand screw thread portion respectively of a screw shaft 35 and the nuts 32 and 33 being engaged with similar left and right hand threads of a screw shaft 36, the shafts 35 and 36 being provided with gear wheels 37 and 38 which interact to render the shafts simultaneously operative to rotate in opposite directions.

The screw shaft 35 is provided with an operating shaft 39 having a short lever 40 for engagement with a link 41 one end of which is pivoted to a lever 42 carried by a shaft 43 that is angularly movable through a handle 44 by the machine operator.

The operation of the chuck is briefly as follows: The chuck is mounted on a threading or pipe cutting machine such as is commonly in use and the pipe or work to be operated on is disposed through the central opening of the chuck. By adjusting the hand lever 44 to a position to rotate shaft 39 in one direction, one set of brake bands, such as the bands 26—27, are tightened on their drum 18 by virtue of their connected nuts 32—33 traversing the thread of the screw shaft 35 in a direction towards each other, thus drawing the brake bands tightly around the drum. When the drum is held against rotation, the block 14 is held stationary causing the gear wheel 11 to rotate the gear ring 8 whereby the cam ring 4 is actuated and the cam plates 5 through engagement with the rollers 6, force the latter radially inwardly to intimately grip the pipe. The operation for releasing the gripping rolls is the same excepting that the hand lever 44 is turned in the direction to cause the brake bands 26' and 27' to engage the drum 19 whereby the rack block 15 is held stationary and the cam ring is actuated through the gear wheels 12 and 13, and the ring gear 8, the latter being rotated in the opposite direction to that for gripping the work, thus releasing the rolls and permitting the removal of the pipe.

The gripping or releasing of the pipe may be accomplished instantaneously at the will of the operator without loss of time since the operating mechanism is rendered operative in its opening and closing action coincident with the movement of the operating lever. The chuck may be held in its open or closed position indefinitely when the hand lever is in its neutral position and the use of the brake bands and operating drums in the manner described, has a cushioning effect on the gripping rolls or jaws which come into action gradually and without jar or loss of time.

Although one embodiment of the invention has been herein illustrated and described, it will be obvious to those skilled in the art that various modifications may be made in the details of construction without departing from the principles herein set forth.

We claim:

A gripping chuck comprising a housing adapted to be mounted for rotation and having a work receiving opening therein, work gripping means in said housing, actuating mechanism for said gripping means including a pair of drums mounted for movement on said housing, brake bands for said drums, and means for selectively engaging a set of bands with one or the other of said drums to actuate said gripping means in its work engaging movements, said last named means comprising a screw shaft having a right and left hand thread, screw nuts interacting with said threads and having the brake bands secured thereto, and operating linkage for actuating said shaft.

In testimony whereof, we have hereunto set our hands.

JOSEPH E. BAINES.
JACOB P. BOSLE.